United States Patent [19]

Cornett et al.

[11] Patent Number: 5,483,258
[45] Date of Patent: Jan. 9, 1996

[54] PICK CORRELATION

[75] Inventors: Kevin B. Cornett, Wappingers Falls; Edward F. Mark, Poughkeepsie, both of N.Y.

[73] Assignee: International Business Machines Corporation, Armonk, N.Y.

[21] Appl. No.: 166,184

[22] Filed: Dec. 10, 1993

[51] Int. Cl.$^6$ ..................................................... G09G 5/00
[52] U.S. Cl. ............................................. 345/118; 395/134
[58] Field of Search ................................... 395/134, 155; 345/118, 156, 139, 145, 146

[56] References Cited

U.S. PATENT DOCUMENTS

| | | | |
|---|---|---|---|
| 4,070,710 | 1/1978 | Sukonick et al. | 364/900 |
| 4,698,625 | 10/1987 | McCaskill et al. | 340/709 |
| 4,751,507 | 6/1988 | Hama et al. | 340/724 |
| 4,941,111 | 7/1990 | Sfarti | 364/521 |
| 4,958,147 | 9/1990 | Kanema et al. | 340/706 |
| 4,982,345 | 1/1991 | Callahan et al. | 364/521 |
| 5,027,291 | 6/1991 | Callahan et al. | 364/521 |
| 5,185,597 | 2/1993 | Pappas et al. | 340/709 |
| 5,202,671 | 4/1993 | Aranda et al. | 340/747 |

OTHER PUBLICATIONS

"Computer Graphics—Principles and Practice" by Foley, vanDam, Feiner and Hughes, Second Edition 1990, Published by Addison Wesley, see specifically, pp. 48–50, 338–339, 111–124 and 925–928.

"Computer Organization and Architecture, Principles of Structure and Function", Second Edition, Macmillan Publishing Company, pp. 276–283.

"Design of the IBM RISC System/6000 Floating Point Execution Unit", by R. K. Montoye et al., IBM Journal of Research and Development vol. 34, No. 1, Jan. 1990, pp. 59–70.

Duvanenko et al. (Dr. Dobbs Journal, Jul., 1990, pp. 36–45, 98, 100) entitled "Improving Line Segment Clipping".

The Nicholl, et al., "An Efficient New Algorithm for 2–D Line Clipping: Its Development and Analysis" ACM, Computer Graphics, vol. 21, No. 4, Jul. 1987, pp. 253–262.

Carl W. Reynolds, entitled "The Sutherland–Hodgman Polygon Clipping Algorithm", Computer Language, Feb. 1993, pp. 51–61.

Foley et al., Fundamentals of Interactive Computer Graphics, 1982, pp. 245–255, 369–381.

*Primary Examiner*—Ulysses Weldon
*Attorney, Agent, or Firm*—Richard Lau; Kris V. Srikrishnan

[57] ABSTRACT

A method of pick correlation comprises the steps of displaying a pick marker on a display screen; directing the pick marker at an image on the display screen, the image comprising at least one line primitive, and the pick marker having a diamond shaped pick window corresponding thereto; subjecting the line primitive to a trivial test, the trivial test comprising enclosing the diamond shaped pick window in a least enclosing rectangle, wherein the diamond shaped pick window and the rectangle have a common center point, and rejecting the line primitive if the line primitive has both of its end-points outside of the same extended edge of the rectangle; if the line primitive cannot be trivially tested, subjecting the line primitive to a non-trivial test which does not require performing floating point operations, and accepting or rejecting the line primitive in accordance with the results of the non-trivial test; and considering accepted line primitives as being selected for further processing.

15 Claims, 5 Drawing Sheets

PICK CORRELATION

FIELD OF THE INVENTION

The present invention relates generally to graphic display systems and, more specifically, to a graphic display system which allows for picking an object from a display screen.

BACKGROUND OF THE INVENTION

Computer graphic images are often made up of line primitives. Line primitives can represent many types of objects in computer graphic systems. Such objects can be, for example, electrical, mechanical, chemical, architectural, or artistic in nature. Most graphic systems represent the object on the display screen by a set of data which represents the coordinates of the line primitives. For example, in a two-dimensional display, these coordinate data sets are sets of values, such as $x_1,y_1$; $x_2,y_2$; etc., which represent each end-point x-y coordinate location of each line primitive contained in the display; more specifically, the coordinate data $x_1,y_1$ corresponds to one end-point of a line primitive, and the companion coordinate data $x_2,y_2$ corresponds to the other end-point of the same line primitive. The quantity of line primitives representing the images on a display screen can be extraordinarily large depending on the number and complexity of objects being displayed. Typically, in design systems, the quantity of line primitives corresponding to the objects shown on a display screen can at any given time range from thousands to hundreds of thousands.

Selecting an object on a screen is commonly referred to as "picking". The picking of an object is generally enabled using a pick marker to select the object on the displayed image. The pick marker used in display systems can take the form of any symbol, such as an arrow, star, polygon, rectangle, line etc.; and a user can move the pick marker about a display screen by various means, such as using a "mouse", light pen, keypad, etc. "Pick correlation" refers to the task of determining if the pick marker has a "hit" on, or has picked, a line primitive (and thus the object to which the line primitive corresponds) in the displayed image.

Currently, two methods are used for pick correlation, the so-called analytical method and the so-called clipping method. An example of an analytical method is disclosed in U.S. Pat. No. 4,698,625, to McCaskill et al. which relates to a technique for facilitating the selection of a graphic object on a display screen by a user. When a pointing cursor is brought to within a predetermined distance of a graphic object, the point on the graphic object closest to the pointing cursor is highlighted to show that the graphic object would be selected if the select button is depressed. If the user then depresses the select button, the entire graphic object is highlighted to indicate that it has been selected.

In contrast to analytical methods, clipping methods generally utilize a pick correlation approach whereby a window or an aperture is made to correspond to a pick marker. Such a window or aperture is referred to as a pick window or pick aperture. The pick window used in clipping methods may sometimes be invisible to a user. Typically, the clipping method rejects each line primitive in a display which does not have at least a portion within, or at least touching or in contact with, the pick window. The line primitive is clipped against the edges or boundaries which define the pick window, i.e., an evaluation is made to determine the intersection between the line primitive and the edges of the pick window, and if the clipping results in at least a portion of the line primitive determined as being within, or at least touching or contacting, the pick window (such line primitive being regarded as being "visible" within the pick window), then the line primitive is picked or accepted.

In order to outline the difficulties of pick correlation, reference is now made to FIG. 1. A rectangular pick window 10 is used to illustrate the difficulties, and it is apparent that similar, and additional, difficulties are encountered for pick correlation for a diamond shaped pick window. A diamond shall be defined herein as a four-sided polygon having sides of equal length, and having one diagonal which is parallel to the x axis and its other diagonal parallel to the y axis; and a diagonal is defined as a line segment which connects two opposite vertices or corner points of the diamond. Four line primitives having end-points labelled as AB, CD, EF and GH are shown. It can be seen that both end-points of line primitive AB are within the pick window 10; one end-point C of line primitive CD is within the pick window 10 and the other end-point D is outside the pick window 10; and both end-points of line primitives EF and GH are outside the pick window 10. Using well known methods of clipping, such as the Cohen-Sutherland method outlined hereinbelow, line primitives which either have both of its end-points or one of its end-points within or contacting the pick window 10 can be trivially accepted, such as line primitive CD and line primitive AB. In other words, the conclusion for either line primitive CD or line primitive AB being within the pick window 10 can be relatively easily derived using conventional techniques. However, the pick decision for line primitives which have both of its end-points outside of the pick window 10, such as line primitives EF and GH, is a difficult determination and typically involves extensive, time-consuming computations.

Several prior art pick correlation methods are discussed in the textbook "Computer Graphics—Principles and Practice" by Foley, vanDam, Feiner and Hughes, Second Edition, 1990, Published by Addison Wesley, see specifically, pp. 48–50, 338–339, 111–124 and 925–928.

A basic line pick correlation technique, referred to herein as the "brute force" method, allows for testing of all line primitives, trivial and non-trivial cases. In the brute force method, line primitives are tested against each edge of the pick window by simultaneously solving line equations. More specifically, a rectangular or diamond shaped pick window, can be described by four line equations, wherein each line equation corresponds to an edge of the pick window. The equation of each pick window edge and the equation of the line primitive are simultaneously solved for determining if common intersect points exist. The intersect points are then tested to determine if they are visible within the pick window, and the line primitive can thus be accepted or rejected. The brute force method requires performing several mathematical operations, including multiplication, division and comparison, for each pick window edge/line primitive pair. The task of testing thousands of line primitives can be substantial and time-consuming even for a computer; and, in order to speed up division and multiplication operations, complicated and expensive processors capable of performing floating point operations, as opposed to simpler fixed point operations, are required. In this regard, implementing fixed point operations, and avoiding floating point operations, generally leads to a simpler and more efficient implementation. Regardless of the particular platform being used, floating point operations are inherently more expensive than fixed point operations. More particularly, floating point numbers have two components that need to be considered, an mantissa and an exponent, as opposed to fixed point numbers which can be exactly represented in a single entity. Further, in contrast to fixed point operations, floating point operations require rounding operations to minimize the inaccuracies inherent in floating point calculations. For example, floating point multiplication involves not only multiplication of the mantissas, but also addition of the exponents; and floating point addition requires three distinct stages, normalization of the mantissas based on the exponents, followed by the actual addition, and then a post normalization of the result. See, generally, "Computer Organization and Architecture, Principles of Structure and Function", Second Edition, Macmillan Publishing Company, pages 276–283, and "Design of the IBM RISC System/6000 Floating Point Execution Unit", by R. K. Montoye et al., IBM Journal of Research and Development, Vol. 34, No. 1, January 1990, pages 59–70, for discussion on floating point arithmetic.

Further, difficulties are encountered when testing vertical line primitives using the brute force method. Vertical line primitives have an infinite slope, and simultaneous solving of equations becomes complicated since division by zero for the slope is required.

The Cohen-Sutherland (C-S) technique ("Computer Graphics—Principles and Practice" by Foley, et al., 1990 Addison Wesley Publishers, pp. 112–117) is another method of pick correlation. As an example, the C-S method, and the difficulties inherent therewith, shall be described below with respect to a rectangular pick window. However, it should be understood that applying the C-S method to a diamond pick window is more difficult, and involves additional complexities, as compared to applying the C-S method to a rectangular pick window. In the C-S method, depending on the location of the end-points of a line primitive with respect to the pick window, each of its end-points is assigned a particular four digit code, referred to as outcode. Referring now to FIG. 2, a rectangular pick window 20 is centered at the origin 0,0 of an x-y coordinate system. The area not within the pick window 20 is divided by dashed lines into eight different outer regions. Including the inner region of the pick window 20, there are a total of nine different regions that need to be considered in determining the location of an end-point of a line primitive. Each of these nine regions has a unique four bit outcode assigned thereto, and these region outcodes are used for comparing to the outcode of the end-points for determining the location of the end-point.

In accordance with the C-S method, each bit of the outcode of an end-point is chosen based on the coordinate value of the end-point. That is, if the y coordinate of the end-point is larger than $y_{max}$, then the first bit of the outcode for the end-point is 1, otherwise the first bit is 0; if the y coordinate of the end-point is smaller than $Y_{min}$, then the second bit of the outcode for the end-point is 1, otherwise the second bit is 0; if the x coordinate of the end-point is larger than $x_{max}$, then the third bit of the outcode for the end-point is 1, otherwise the third bit is 0; and if the x coordinate of the end-point is smaller than $x_{min}$, then the fourth bit of the outcode for the end-point is 1, otherwise the fourth bit is 0; where $x_{max}$, $x_{min}$, $y_{max}$ and $y_{min}$ define the maximum and minimum x and y coordinates of the pick window 20 edges.

The outcodes of the end-points of a line primitive are compared with the outcodes assigned to each of the nine different regions. If both end-points of a line primitive have an outcode of 0000 then the line primitive is visible within the pick window 20, and the line primitive is trivially accepted. If both end-point outcodes of a line primitive has a bit with a value of 1 in an identical bit position, then both end-points are in one or more regions outside of the same extended edge of the pick window and the line primitive is trivially rejected. For example, if the first bit of both end-point outcodes has a value of 1, then it is known that the line primitive is in the region(s) outside of the extended upper edge of the pick window, and the line primitive can be trivially rejected. For all other cases, the line primitive may intersect at least one edge of the pick window 20. Additional steps and calculations must be performed for such a determination. In this regard, the outcode of an end-point in one of the outer regions is clipped against an edge of the pick window 20 using the brute force method to determine if there is an intersect point. If an intersect point is found, the portion of the line primitive from the intersect point to the subject outer end-point is rejected as being outside of the pick window 20, and this portion of the line primitive is disregarded by replacing the subject outer end-point with the intersect point, and the original line primitive is now replaced by a modified line primitive for further testing. The intersect point is then assigned an outcode, and the modified line primitive is subjected to the trivial test. If the modified line primitive cannot be trivially accepted or rejected using the trivial test, then one of its end-points which is in an outer region is chosen and replaced by a new intersect point for clipping with another pick window edge, again, using the brute force method, and thus, once another intersect point is found, the line primitive is again redefined and subjected to the trivial test. This process is reiterated, if required, until clipping with all pick window edges is completed.

The Cohen-Sutherland technique is considered to be an improvement for trivial testing of line primitives. However, for the line primitives that cannot be successfully tested using the trivial accept/reject criteria enunciated by Cohen-Sutherland, clipping of the line primitive using the brute force method is required before retesting with the trivial test, and the brute force method, as discussed above, undersirably requires solving simultaneous equations and performing numerous floating point multiplication and division operations. Compared to the basic brute force technique, the C-S method has reduced the number of line primitives which actually require the brute force method by allowing certain line primitives to be trivially accepted or rejected. However, using the C-S method, multiple clippings may be required for those line primitives which are subjected to the brute force method. Further, the C-S technique disadvantageously performs clipping operations in a fixed manner, oftentimes resulting in the performance of unnecessary, extraneous clipping operations.

Duvanenko et al. (Dr. Dobbs Journal, July, 1990, pp. 36–45, 98,100) discloses a technique which attempts to speed up the Cohen-Sutherland method. In Duvanenko et al., calculation of the slope and inverted slope is performed only once per line primitive. Duvanenko et al. discloses optimizing the C-S method by omitting certain boundary or edge comparisons so that the total number of floating point operations is reduced. However, even with the reduction, the Duvanenko et al. method still requires a significant number of floating point operations to be performed.

Two additional methods are the Cyrus-Beck method and the Liang and Barsky method, "Computer Graphics—Principles and Practice", by Foley, et al., 1990 Addison Wesley Publishers, pp. 117–124. The Cyrus-Beck method implements a parametric line algorithm which finds the value of a parameter t in the parametric representation of the line primitive for the point at which that line primitive intersects the infinite line on which the clip pick window edge lies. Since all edges are somewhere intersected by the line primitive, four values of t can be calculated. A series of comparisons is then used to determine if any of the four values of t correspond to an "actual" intersection of the edge of the pick window. The coordinate values for the one or two actual intersections can then be calculated. Thus, the Cyrus-Beck method saves time as compared to the Cohen-Sutherland method in that the Cyrus-Beck approach avoids the repetitive looping needed to clip to multiple edges, and the actual calculation of the coordinates of the intersect points is postponed until needed. The Liang and Barsky method is considered to be an improvement over the Cyrus-Beck technique because the Liang and Barsky technique examines each t value as it is generated, so that some line primitives can be rejected before all four t values have been computed. Although Cyrus-Beck and Liang and Barsky offer some degree of improvement, both of these methods still require numerous floating point multiplication and division operations to be performed.

The Nicholl et al. method as disclosed in "An Efficient New Algorithm for 2-D Line Clipping: Its Development and Analysis", ACM, Computer Graphics, Volume 21, Number 4, July 1987, pp. 253–262, uses an alternate approach to improve the non-trivial testing of the line primitives that cannot be tested by the Cohen-Sutherland method of trivial testing. The Nicholl et al. method involves dividing the two-dimensional space of the display screen by connecting a line from a selected end-point of the line primitive to each of the four corners of the pick window. By subdividing the plane into many regions, calculation of intersect points which are external to the pick window can be avoided. The Nicholl et al. method claims to speed up the non-trivial test, but it is complex to implement and requires performing many multiplication operations.

To summarize, it is a generally accepted that the Cohen-Sutherland technique is efficient for trivial testing, and alternate techniques are necessary to improve testing of line primitives that cannot be accepted or rejected using the Cohen-Sutherland trivial test.

The aforementioned methods generally attempt to achieve the goals of performing a minimum number of operations during testing so as to achieve speed, avoiding floating point calculations, particularly division calculations, and providing for simplified coding of the algorithm. However, none of these methods are able to achieve all of these goals. There is a clear need in graphic display for a line pick correlation method that can realize faster computations, fewer operations to test the lines and ease of coding.

OBJECTS OF THE INVENTION

An object of the present invention is to overcome deficiencies in prior art pick correlation methods.

Another object of the present invention is to more efficiently determine whether or not a line primitive is visible within a diamond shaped pick window.

A further object of the present invention is to increase the speed in determining whether or not a line primitive is visible within a diamond shaped pick window.

Still another object of the present invention is to perform pick correlation using minimal arithmetic operations, such as, multiplication, division and comparison operations.

Yet another object of the present invention is to perform pick correlation without requiring floating point operations.

A still further object of the present invention is to provide a method of pick correlation with a diamond shaped pick window that is relatively simple to implement.

SUMMARY OF THE INVENTION

Generally, the present invention relates to a method of pick correlation. Such a method includes the steps of displaying a pick marker on a display screen, and directing the pick marker at an image on the display screen. The image comprises at least one line primitive, and the pick marker has a diamond shaped pick window corresponding thereto. The line primitive is subjected to a trivial test. The trivial test comprises enclosing the diamond shaped pick window in a least enclosing rectangle, wherein the diamond shaped pick window and the rectangle have a common center point. The line primitive is trivially rejected if the line primitive has both of its end-points outside of the same extended edge of the rectangle. If the line primitive cannot be trivially tested, the line primitive is subjected to a non-trivial test which does not require performing floating point operations. The line primitive is accepted or rejected in accordance with the results of the non-trivial test. The accepted line primitives are considered as being selected for further processing.

BRIEF DESCRIPTION OF THE INVENTION

The objects, features and advantages of the invention will be apparent from the following more particular description of the invention as illustrated in the accompanying drawings, in which.

DETAILED DESCRIPTION OF THE INVENTION

Figure 3:
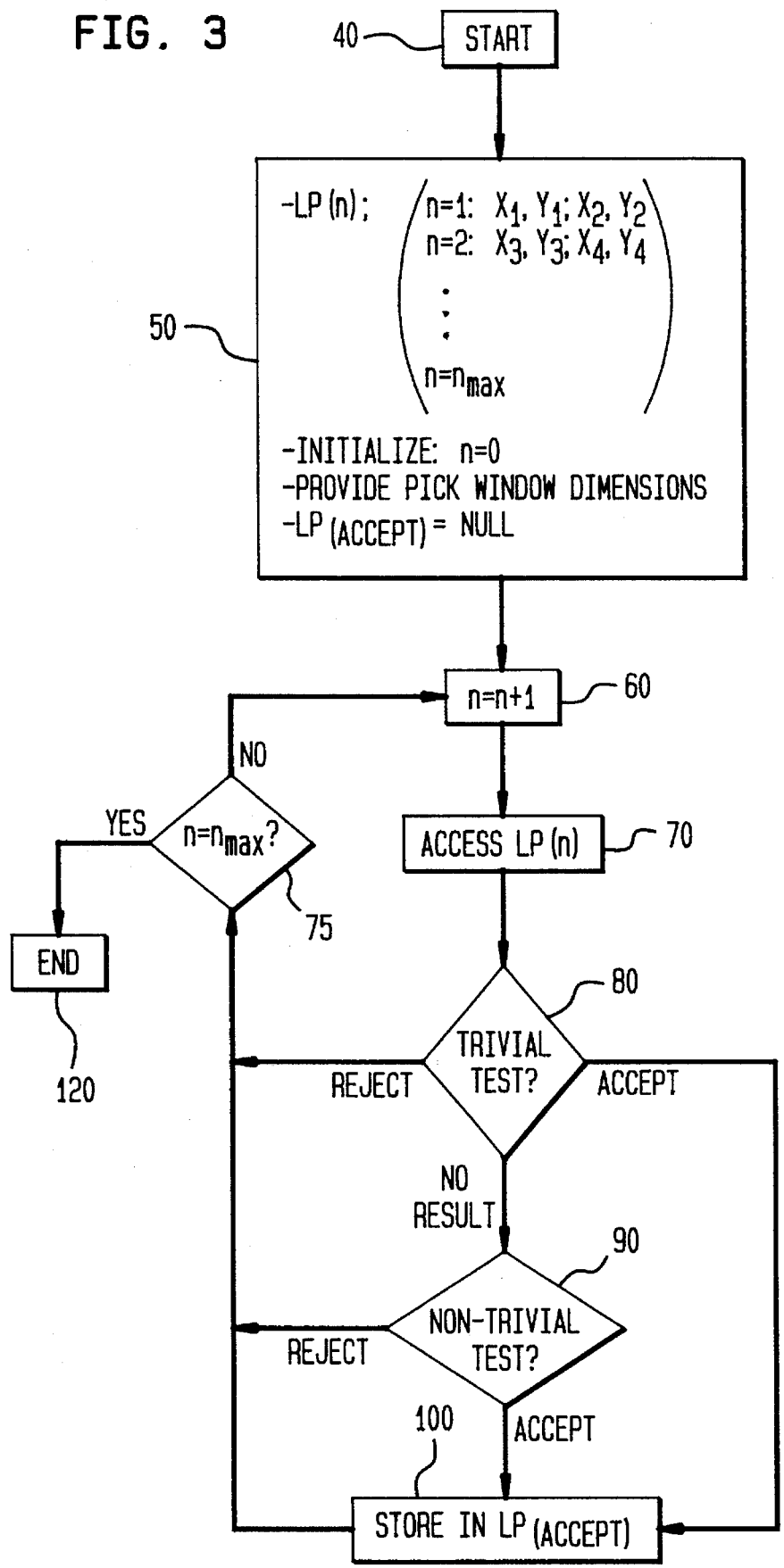
FIG. 3 shows a flowchart of pick correlation in accordance with the present invention.

Referring to FIG. 3, initiation begins at START block 40 when a user selects a displayed image on a display screen using a pick marker. The pick marker corresponds to a pick window. At block 50, a line primitive data set, LP(n), is provided. The line primitive data set LP(n) is a listing of x,y coordinate values. As discussed above, the images on a display screen are made up of a multitude of line primitives and the coordinate values in the line primitive data set LP(n) represent and correspond to the relative location of each end-point of each line primitive displayed on the screen at the time the object is selected, wherein $x_1$, $y_1$ and $x_2$, $y_2$ represent and correspond to the end-point coordinates of the first line primitive stored in the data set LP(n), $x_3$, $y_3$ and $x_4$, $y_4$ represent and correspond to the end-point coordinates of the second line primitive stored in the data set LP(n), and so forth, and $n_{max}$ is the the total number of line primitives displayed on the screen and stored in the line primitive data set (these values being equal). The variable n is used for tracking the sequential testing of the line primitives so that it can be determined when all line primitives have been tested, and it can be seen that for each n, there are two corresponding x-y locations, each x-y location representing an end-point of a line primitive. The variable n is initialized as zero at block 50 and incremented as each line primitive is tested for accessing the next line primitive for the next iteration. Testing is complete when n equals $n_{max}$.

Figure 5:
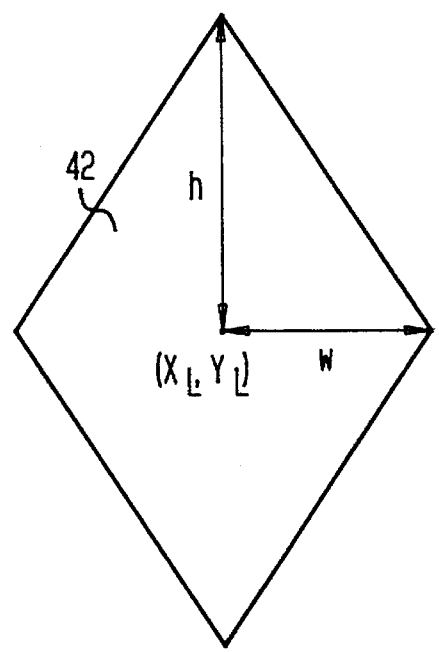
FIG. 5 shows a diamond pick window.

Each line primitive must be tested to determine if it is visible within the pick window corresponding to the pick marker. Thus, at block 50, coordinates and dimensions of the pick window must also be provided. The particular dimensions that are required to be provided depends on the particular shape of the pick window being used. Pick correlation for a rectangular shaped pick window is described in commonly assigned, co-pending, patent application Ser. No. 08/155,962, Attorney Docket No. FI9-93-051, filed Nov. 19, 1993. With reference to FIG. 5, a diamond shaped pick window 42 is considered herein. As above, a diamond shall be defined herein as a four-sided polygon having sides of equal length, and having one diagonal which is parallel to the x axis and its other diagonal parallel to the y axis; and a diagonal is defined as a line segment which connects two opposite vertices or corner points of the diamond. For the diamond shaped pick window 42, the coordinates of its center, $x_L$, $Y_L$, and the dimensions of its maximum half-width, w, and its maximum half-height, h, are required to be provided. Thus, the diamond pick window 42 has one diagonal with a length of 2w, and the other diagonal with a length of 2h.

Further, a data set, LP(accept), is defined at block 50 for storing all the line primitives that are determined as being visible within the pick window. The line primitives stored in the LP(accept) data set are thus the line primitives that were selected by the user for further processing or, more specifically, the object corresponding to these line primitives was selected by the user for further processing. The LP(accept) data set is initialized at block 50 as being NULL.

The variable n is incremented at block 60, and the two end-point coordinates stored in the line primitive data set LP(n) corresponding to the next line primitive is accessed at block 70. In other words, blocks 60 and 70 allow for the line primitives to be accessed and tested sequentially in accordance with the order in which they are stored in the line primitive data set LP(n).

At block 80, a trivial test is conducted on the line primitive being tested. As described below, the Cohen-Sutherland (C-S) method described hereinabove in the BACKGROUND OF THE INVENTION can be used at block 80 for trivially rejecting certain line primitives and, in a preferred embodiment, an enhanced version of the C-S method is used at block 80 for trivially accepting certain other line primitives.

Figure 6:
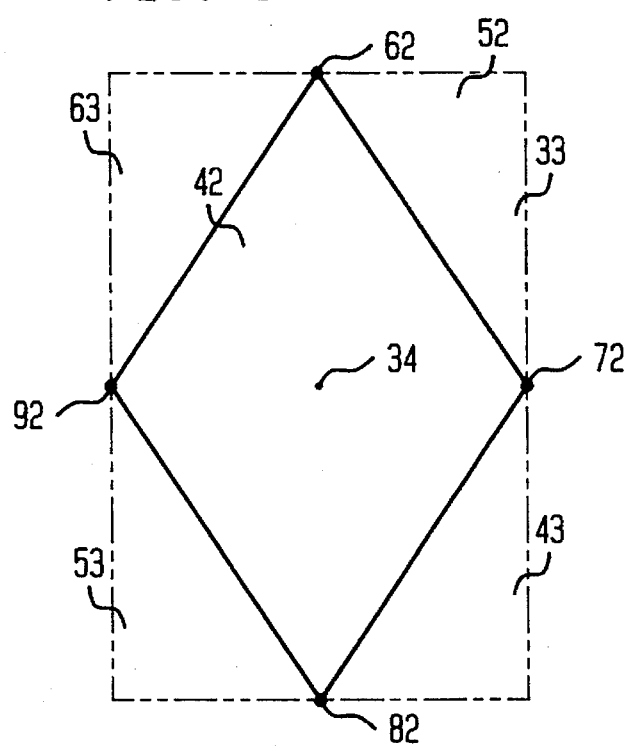
FIG. 6 shows the diamond pick window of FIG. 4 enclosed in a least enclosing rectangle.

In order to implement the C-S method, the diamond pick window 42 is enclosed within a rectangle; such a rectangle being referred to as the C-S rectangle and illustrated in FIG. 6 with dashed lines, and referred to with reference numeral 52. The C-S rectangle 52 encloses the diamond pick window 42 therein, and has a common center point 34 with the diamond pick window 42; and the vertices or corner-points 62, 72, 82 and 92 of the diamond pick window 42 are points along the edges of the C-S rectangle 52. As such, the C-S rectangle 52 has a height of 2h and a width of 2w, and this height 2h and width 2w represent the minimum dimensions for a rectangle to completely enclose the diamond pick window 42 therein, i.e., the C-S rectangle 52 is the least enclosing rectangle for the diamond pick window 42. Further, the corner regions are defined and also illustrated in FIG. 6. The corner regions are referenced with reference numerals 33, 43, 53 and 63. As shown, the corner regions 33, 43, 53 and 63 are each triangularly shaped, and the borders of the corner regions 33, 43, 53 and 63 are defined by the C-S rectangle 52 and the diamond pick window 42.

In accordance with the invention, at a minimum, the trivial test at block 80 should be capable of testing (rejecting) line primitives which have both of its end-points in one or more regions outside of the same extended edge of the C-S rectangle 52. However, for increased efficiency, the trivial test at block 80 can also include the capability of testing (accepting) line primitives which have its end-points in opposite outer, non-extended, edge regions relative to the C-S rectangle 52.

In order to determine if the line primitive has both of its end-points in one or more regions outside of the same extended edge of the C-S rectangle 52, in accordance with the C-S method, the outcodes of the end-points of the line primitive are assessed to determine if they each have a value of 1 in identical outcode bit position. If the end-points do have a value of 1 in identical outcode bit position, then the line primitive does have both of its end-points in one or more regions outside of the same extended edge of the C-S rectangle 52, and the line primitive is trivially rejected. If the line primitive is trivially rejected at block 80, a determination is then made at block 75 to assess whether the line primitive tested was the last or final line primitive to be tested, i.e., whether the variable n is equal to $n_{max}$. If it was the last line primitive to be tested, then the testing ends at block 120. However, if the line primitive was not the last to be tested, then the variable n is incremented at block 60 and the next line primitive is accessed at block 70, and testing continues.

Figure 1:
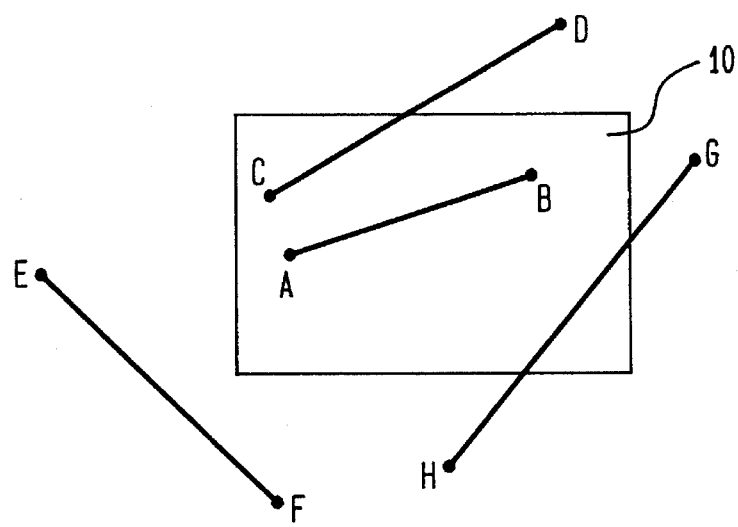
FIG. 1 shows various line primitives relative to a pick window.
Figure 2:
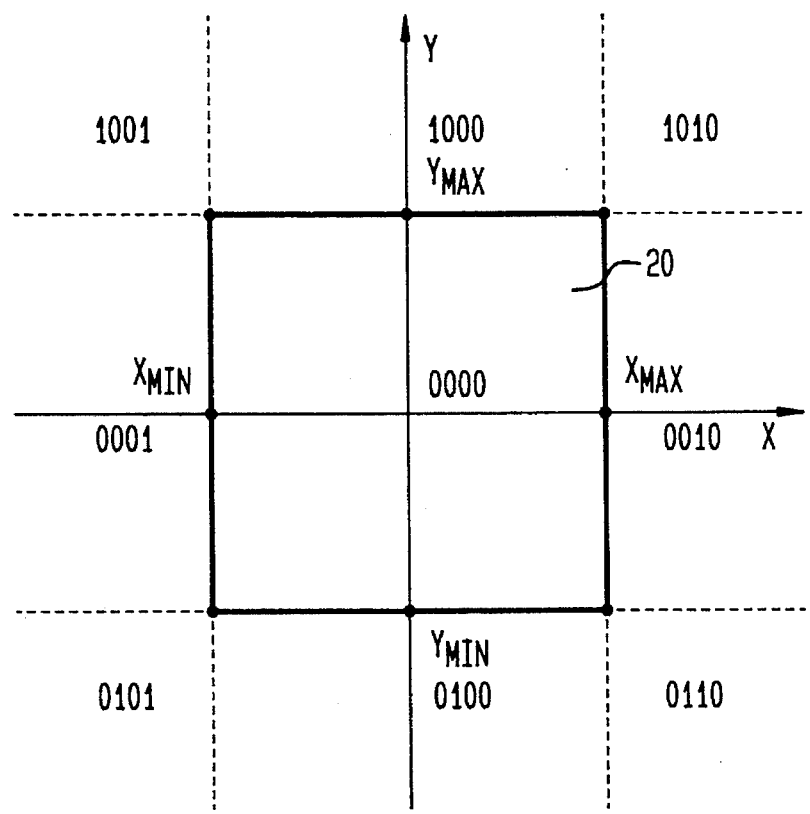
FIG. 2 illustrates the Cohen-Sutherland approach for accepting or rejecting line primitives.

In accordance with the enhancement to the C-S method, the line primitives are tested to determine if its end-points are located in opposite outer, non-extended, edge regions relative to the C-S rectangle 52. In this regard, if the logical inclusive OR of the line primitive end-point outcodes is equal to 1100 or 0011, then the line primitive is visible within the C-S rectangle 52, and thus also visible within the diamond pick window 42, and the line primitive is thus picked or accepted. As is apparent in FIG. 2, when the logical inclusive OR of the end-point outcodes equals 1100 or 0011, this indicates that the end-points of the line primitive are in opposite outer, non-extended, edge regions and the line primitive must therefore pass through the C-S rectangle 52, and thus also through the diamond pick window 42. More specifically, if the line primitive has one of its end-points in the outer region with the assigned outcode 1000 and has its other end-point in the outer region with the assigned outcode 0100, then the logical inclusive OR of its end-point outcodes equals 1100, and it is apparent that the line primitive with such end-points must be visible within the C-S rectangle 52, and thus also within the diamond pick window 42; and if the line primitive has one of its end-points in the outer region with the assigned outcode 0001 and has its other end-point in the outer region with the assigned outcode 0010, then the logical inclusive OR of its end-point outcodes equals 0011, and it is apparent that the line primitive with such end-points must be visible within the C-S rectangle 52, and thus also within the diamond pick window 42. This enhancement effectively allows for testing more line primitives than does the basic Cohen-Sutherland method. As shown in FIG. 3, if the line primitive is trivially accepted at block 80, then the line primitive is stored in the LP(accept) data set at block 100, and the variable n is again tested at block 75 to determine if the last line primitive has been tested or if other line primitives need to be tested.

If the line primitive cannot be trivially accepted or rejected at block 80, i.e., no result can be ascertained as a result of the trivial test at block 80, then the line primitive is subjected to the non-trivial test at block 90. It is preferred that the line primitives be subjected to the trivial test at block 80 before being subjected to the nontrivial test at block 90, because trivial testing is generally faster and more efficient than the non-trivial test. However, as discussed in the BACKGROUND OF THE INVENTION, trivial testing has limitations in that not all line primitives can be tested using a trivial test, and for these line primitives, the non-trivial test at block 90 needs to be implemented. The non-trivial test at block 90 is discussed in greater detail hereinbelow.

Figure 4:
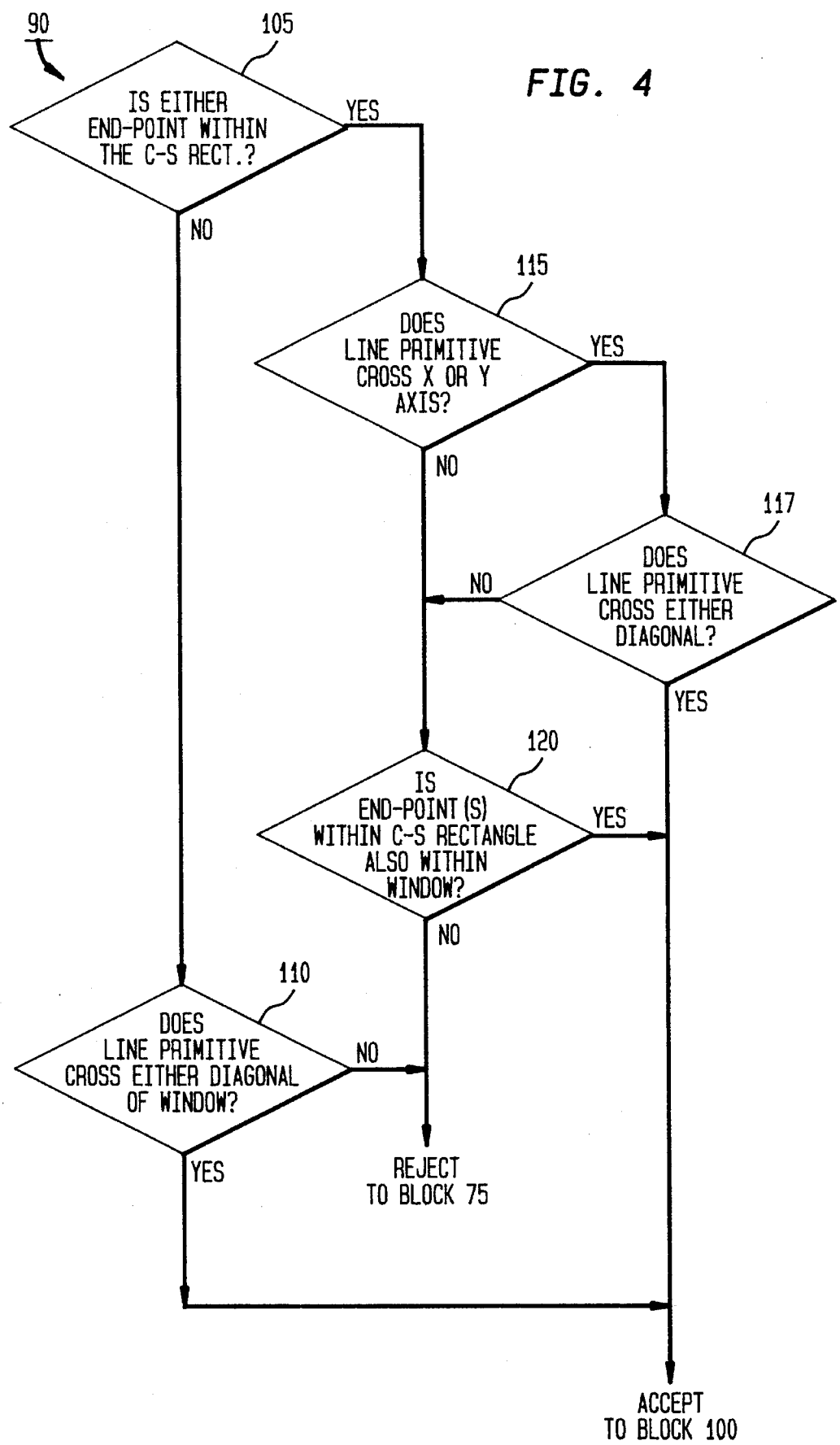
FIG. 4 is a flowchart showing more details of block 90 in the flowchart shown in FIG. 3.

Reference is now made to FIG. 4, which shows details of the non-trivial test at block 90. At block 105, it is determined if one or both end-points of the line primitive is within the C-S rectangle 52. This is accomplished, in accordance with the C-S method, by determining if one or both end-points of the line primitive has a 0000 outcode. If it is determined that neither end-point is within the C-S rectangle 52, i.e., neither end-point of the line primitive has a 0000 outcode, then it is determined at block 110 if the line primitive crosses either one or both of the diagonals of the diamond pick window 42.

Figure 7:
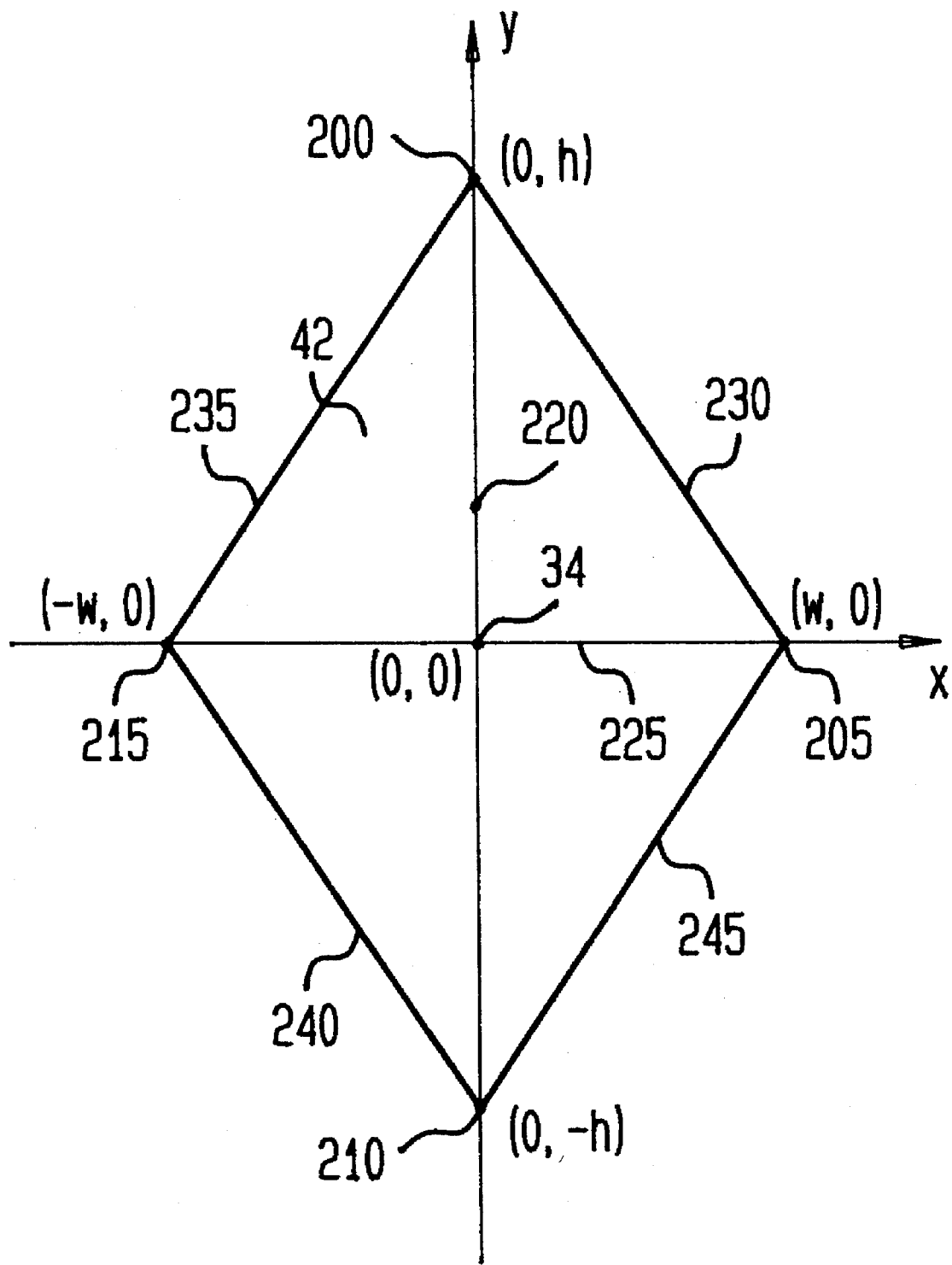
FIG. 7 shows the diamond pick window of FIG. 4 transformed so that its center point is at the origin coordinates 0,0 of an x-y coordinate system.

In accordance with the determination at block 110, a transformation is performed on the center point 34 of the diamond pick window 42, and a corresponding transformation is performed on the end-points of the line primitive being tested. More specifically, as shown in FIG. 7, the center point 34 of the diamond pick window 42 is transformed so as to be at coordinates 0,0 of an x-y coordinate system. Thus, since the diamond pick window 42 has a half-height of h and a half-width of w, the vertices or corner points 200, 205, 210 and 215 of the diamond pick window 42 are located at locations (0,h), (w,0), (0,-h) and (-w,0), respectively. Further, the coordinates of the end-points of the line primitive are correspondingly transformed relative to the center point 34 of the diamond pick window 42 being at coordinates 0,0. This is accomplished by subtracting the values of $x_L$, $y_L$ from the corresponding coordinate line primitive end-point values. Such transformations simplify the resulting equations required in the non-trivial test. Also shown in FIG. 7 are the diagonals 220 and 225 of the diamond pick window 42; diagonal 220 has end-points at corner points 200 and 210, and diagonal 225 has end-points at corner points 205 and 215.

In order to determine if the line primitive crosses one or both of the diagonals 200 or 210, the line primitive is subjected to equations (1) and (2) as follows:

$$|h*dx| >= |T| \quad (1)$$

$$|w*dy| >= |T| \quad (2)$$

where the end-points of the line primitive are located at coordinates $x_1$, $y_1$ and $x_2$, $y_2$; $dx = x_1-x_2$; $dy = y_1-y_2$; and $T = x_1*y_2 - y_1*x_2 = y_1*dx - x_1*dy$; and T is defined as the threshold value of the line primitive and is unique to each line primitive.

Equation (1) determines if the line primitive crosses or touches diagonal 220; and equation (2) determines if the line primitive crosses or touches diagonal 225. It should be noted that equations (1) and (2) test the line primitive in an extended manner, i.e., the line primitive being extended indefinitely beyond its end-points. However, since the line primitive has already been trivially tested at block 80 as not having its end-points in one or more regions outside of the same extended edge of the C-S rectangle 52 and, in the enhanced version of the C-S method, not being in opposite outer, non-extended, edge regions, and since it has already been determined at block 105 that neither end-point is within the C-S rectangle 52, it can now be certain under these conditions that, if the line primitive crosses one or both of the diagonals 220, 225, then the line primitive is visible within the diamond pick window 42, and the fact that equations (1) and (2) test the line primitive in an extended manner is of no consequence. The derivation or proof for equations (1) and (2) is given below. Thus, at block 110, if either equation (1) or equation (2) is true for the line primitive, then the line primitive is accepted or picked, and the line primitive is stored in the LP(accept) data set at block 100; and if neither equation (1) nor equation (2) is true for the line primitive, then the line primitive is rejected, and the procedure continues to block 75.

If it is determined at block 105 that one or both end-points is within the C-S rectangle 52, i.e., one or both end-points of the line primitive has a 0000 outcode, then the procedure continues to block 115 for further analysis of the line primitive. Although visible within the C-S rectangle 52, it is uncertain with these results whether or not the line primitive is visible within the diamond pick window 42. In this regard, both end-points of the line primitive can be in the same corner region 33, 43, 53 or 63, or one end-point can be in a corner region and the other end-point can be outside of the C-S rectangle 52. Further, since equations (1) and (2) test the line primitive in an extended manner, if one or both end-points is within the C-S rectangle 52, equations (1) and (2), alone, will not adequately determine if the line primitive is within the diamond pick window 42. As a specific example, if an end-point of a line primitive is located in a corner region 33, 43, 53 or 63 so that the line primitive terminates in the corner region 33, 43, 53 or 63, such a line primitive may be inaccurately picked if it crosses or touches the diamond pick window 42 when extended.

At block 115, referring again to FIG. 7, a determination is made as to whether the line primitive crosses either the x axis or the y axis. This can be accomplished by assessing whether the transformed coordinates of the end-points of the line primitive have the same sign, i.e., positive or negative. Specifically, the transformed x coordinate values of each of the end-points are compared, and the transformed y coordinate values of each of the end-points are compared. If the transformed x coordinate values each have the same sign, positive or negative, then the line primitive does not cross the y axis, and if the transformed y coordinate values each have the same sign, positive or negative, then the line primitive does not cross the x axis; however, if the transformed x coordinate values do not have the same sign, then the line primitive crosses the y axis, and if the transformed y coordinate values do not have the same sign, then the line primitive crosses the x axis.

If it is determined at block 115 that the line primitive crosses either the x axis or the y axis, then a determination is made at block 117 as to whether the line primitive crosses diagonal 220, or whether the line primitive crosses diagonal 225. If either of these conditions is true for the line primitive at block 117, then the line primitive is accepted or picked. The line primitive can be tested for these conditions as follows:

$|h*dx| >= |T|$ AND the line primitive crosses the y axis

OR $|2*dy| >= |T|$ AND the line primitive crosses the x axis where, as above, the end-points of the line primitive are located at coordinates $x_1$, $y_1$ and $x_2$, $y_2$; $dx = x_1-x_2$; $dy = y_1-y_2$; and $T = x_1*y_2 - y_1*x_2 = y_1*dx - x_1*dy$; and T is defined as the threshold value of the line primitive and is unique to each line primitive.

It can be appreciated that equation (1) is used for determining whether the extended line primitive crosses diagonal 220, and equation (2) is used for determining whether the extended line primitive crosses diagonal 225; and, as above in block 115, it is determined whether the non-extended line primitive crosses the y axis or x axis by assessing whether the transformed coordinates of the end-points of the line primitive have the same sign. Equation (1) and equation (2) determine whether the line primitive, extended, crosses either diagonal 220 or diagonal 225, respectively, and the determination of whether the non-extended line primitive crosses the y axis or x axis allows for assessment of whether such crossing of diagonal 220 or 225 is by the line primitive itself, i.e., non-extended.

If it is determined at block 115 that the line primitive does not cross either the x axis or the y axis, then the procedure continues to block 120 to determine if the end-point(s) that was determined to be within the C-S rectangle 52 at block 105 is also within the diamond pick window 42. Further, if it is determined at block 117 that the line primitive does not cross either diagonal 220 or diagonal 225, then it remains uncertain as to whether the line primitive is visible within the diamond pick window 42, and the procedure also continues to block 120.

At block 120, the line primitive is subjected to inequality (3) to determine if the end-point(s) that was determined at block 105 to be within the C-S rectangle 52 is also visible within the diamond pick window 42.

$$|wy|+|hx|>=wh \quad (3)$$

where x and y are the coordinates of the end-point(s) that was determined at block 105 to be within the C-S rectangle 52. The derivation or proof for inequality (3) is given below.

In an article by Carl W. Reynolds, entitled "The Sutherland-Hodgman Polygon Clipping Algorithm", *Computer Language*, February 1993, pp. 51–61, a technique is disclosed to determine which side of a line an arbitrary point lies, i.e., the technique can be used to determine which half-plane created by the line the arbitrary point is located. Reynolds shows that the function shown in equation (4) can be derived from the basic line equation, y=mx+b.

$$F(x,y)=(y-y_1)(x_2-x_1)-(y_2-y_1)(x-x_1) \quad (4)$$

where x and y are the coordinates of the arbitrary point, and $x_1, y_1; x_2, y_2$ are the end-points of the line being assessed for locating the arbitrary point. The function of equation (4) produces a negative value for points on one side of the line, and a positive value for points on the other side of the line.

By applying the function of equation (4) to the edges of the diamond pick window 42, and using symmetry, inequality (3) can be derived. More specifically, referring again to FIG. 7, applying equation (4) to edge 230 of the diamond pick window 42, edge 230 having end-points 200 and 205 located at (0,h) and (w,0), respectively, equation (5) is obtained as follows:

$$\begin{aligned} F(x,y) &= (y-y_1)(x_2-x_1)-(y_2-y_1)(x-x_1) \\ &= (y-h)(w-0)-(0-h)(x-0) \\ &= wy-wh+hx \end{aligned} \quad (5)$$

Using the center point 34 at location (0,0) of the diamond pick window 42 as the arbitrary point, and substituting the center point 34 at location (0,0) in equation (5) produces the following:

$$\begin{aligned} F(x,y) &= wy-wh+hx \\ &= w0-wh+h0 \\ &= -wh \end{aligned}$$

As shown, the function of equation (4) results in a negative value for edge 230 and center point 34. Thus, it can be said that any point that results in a negative value for equation (4) for edge 230 must be located on the same side of the edge 230 that the center point 34 is located.

If equation (5) is a negative value, then the following inequality using equation (5) is true, and inequality (6) can be obtained as follows:

$$wy-wh+hx<=0$$

$$wy+hx<=wh \quad (6)$$

Using the same reasoning for the other edges 235, 240 and 245 of the diamond pick window 42 as was used for edge 230, and also using the center point 34 as the arbitrary point for substituting into the function, inequalities (7), (8) and (9) can be obtained as follows:

$$-wy+hx>=-wh \quad \text{(for edge 235)}$$

$$-wy-hx<=wh \quad \text{(for edge 240)}$$

$$wy-hx>=-wh \quad \text{(for edge 210)}$$

Since the center point 34 at location (0,0) of the diamond pick window 42 was used as the arbitrary point, it can be observed that for any point to be within the interior of the diamond pick window 42, all four inequalities (6), (7), (8) and (9) must hold true. Further simplification of these inequalities is performed below.

Multiplying inequalities (7) and (9) by −1 produces inequalities (7') and (9') as follows:

$$wy-hx<=wh \quad (7')$$

$$-wy=hx<=wh \quad (9')$$

For a given point within the diamond pick window 42, all four inequalities (6), (7'), (8) and (9') must be true. If these four inequalities (6), (7'), (8) and (9') are true, further simplifications can be performed. In this regard, if (6) and (7') are true, then inequality (10) can be inferred as follows:

$$wy+|hx|<=wh \quad (10)$$

Inequality (10) is true because inequalities (6) and (7') differ only by a positive and negative hx term. Therefore, inequality (10) must also hold true for the largest hx term, either positive or negative, or the absolute value of hx, i.e., |hx|, as in inequality (10).

Similarly, using the same reasoning, if inequality (8) and (9') are both true, inequality (11) can be concluded as follows:

$$-wy+|hx|<=wh \quad (11)$$

Now, it can be seen that inequalities (10) and (11) differ only by a positive and negative wy term. Thus, again using the same reasoning, if inequality (10) and (11) are true, inequality (12) can be implied as follows:

$$|wy|+|hx|<=wh \quad (12)$$

Inequality (12) is true only when all four inequalities (6), (7'), (8) and (9') are true. Therefore, if inequality (12) is true, then the point (x,y) is within the pick window. Inequality (12) is the same as inequality (3) above, and thus the derivation of inequality (3) is complete.

With reference again to FIG. 7, the derivation or proof for equations (1) and (2) is given below. It can be observed, and it is apparent that, for the diamond pick window 42, no extended line primitive can cross or at least touch the diamond pick window 42 without crossing or at least touching one or both of the line segments 220 and 225. This observation simplifies the derivation of equations (1) and (2).

Consider a line primitive and the conditions under which it will cross or touch the line segment 220. The line primitive has the following equation:

$$w=m*(x-x1)+y1,$$

where m is the slope of the line primitive, and (x1,y1) is any point on the line primitive.

The extended line primitive will cross or touch the line segment 220, if, at x=0, the absolute value of the y value of the extended line primitive is less than or equal to h, as follows:

$$h>=|y|=|m*(0-x1)+y1|$$

$$>=|y|=|-m*x1+y1|$$

$$h>=|y|=|-(dy/dx)*x1+y1|$$

$$h*|dx|>=|y*dx|=|-dy*x1+dx**y1|=|T|$$

where $T=y1*dx-x1*dy$ $$|h*dx|>=|T| \qquad (12)$$

Now, consider an extended line primitive crossing or touching line segment 225, the extended line primitive can be represented as follows:

$$x=(1/m)*(y-y1)+x1 \text{ ps}$$

In this case, the extended line primitive will cross or touch the line segment 225, if, at y=0, the absolute value of the x value of the extended line primitive is less than or equal to w, as follows:

$$w>=|x|=|(1/m)*(0-y1)+x1|$$

$$w>=|x|=|-y1/m+x1|$$

$$2>=|x|=|-y1*(dx/dy)+x1|$$

$$w*|dy|>=|x*dy|=|-y1*dx+x1*dy|=|-T|$$

$$|w*dy|>=|T| \qquad (13)$$

Equations (12) and (13) are the same as equations (1) and (2), respectively, and thus the derivation of equations (1) and (2) is complete.

The above described testing gives highly precise and accurate picking results. However, in some situations exact precision is not required, and speed is a more important consideration. Those skilled in the art can appreciate that the present invention is adaptable for such situations. For instance, in an alternate embodiment, for the diamond pick window, the same trivial test at block 80 is used, however, when either end-point of the line primitive is determined at block 105 to be within the C-S rectangle 52, then the line primitive will be picked; and if neither end-point is determined to be within the C-S rectangle, then the determination is made at block 110 as to whether the line primitive crosses either diagonal of the diamond pick window. Therefore, in this embodiment, blocks 115,117 and 120 are not utilized and speed is thus enhanced, and imprecision may occur when a line primitive has one or both end-points located in one of the corner regions 33, 43, 53 or 63 of the C-S rectangle 52. In other words, if a line primitive has one or both end-points located in one of the corner regions 33, 43, 53 or 63 of the C-S rectangle 52, even though the line primitive may not be visible within the diamond pick window 42, such a line primitive will be inaccurately picked.

Auch imprecise non-trivial testing is particularly useful when high speed testing is critical. Further, it should be noted that the dimensions of a pick window, diamond or rectangle, is generally very small, typically having a height and width with dimensions on the order of 1–1.5 millimeters. Given such dimensions, it follows that the corner regions 33, 43, 53 and 63 are also very small. Thus, it would be rare that a line primitive be visible in one of the corner regions 33, 43, 53 and 63 without being visible in the diamond 42; and even if such a line primitive occurred, the imprecise picking of this line primitive would be barely perceivable to a user.

Advantages of the present invention over alternate methods described hereinabove can be illustrated by comparing the number of different mathematical operations required in performing a non-trivial test for a line primitive. This is shown in Table 1 below, which compares the non-trivial test of the present invention with a typical brute force method. Particularly note that any of the three Cases of the present invention requires fewer total operations; and the operations that are required are the simpler to implement non-floating point operations, as compared to the complex, time-consuming floating point operations required in the brute force method. Further, although Case 3 of the present invention is considered to be the "worse" case of the present invention because it involves the most number of operations as compared to Case 1 and Case 2, it should be noted that Case 3 is unlikely to occur very often in any picking task. This third case involves utilizing the determinations in each of blocks 105, 115, 117 and 120 in order to test a line primitive, and the chance that a line primitive is required to be subjected to all of these determinations is minimal. Additionally, even the worse case, Case 3, of the present invention does not require complex floating point operations to be performed, and thus even the "worse" Case 3 of the present invention improves over the brute force method.

TABLE 1

| Operation | Brute Force | Present Invention | | |
|---|---|---|---|---|
| | | Case 3 | Case 2 | Case 1 |
| Non-Floating Point: | | | | |
| Absolute Value | 0 | 7 | 3 | 2 |
| Comparisons | 0 | 8 | 6 | 3 |
| Subtraction | 0 | 7 | 7 | 5 |
| Addition | 0 | 2 | 0 | 0 |
| Multiplication | 0 | 8 | 4 | 4 |
| Division | 0 | 0 | 0 | 0 |
| TOTALS | 0 | 32 | 20 | 14 |
| Floating Point: | | | | |
| Absolute Value | 4 | 0 | 0 | 0 |
| Comparisons | 16 | 0 | 0 | 0 |
| Subtraction | 10 | 0 | 0 | 0 |
| Addition | 4 | 0 | 0 | 0 |

TABLE 1-continued

| Operation | Brute Force | Present Invention | | |
|---|---|---|---|---|
| | | Case 3 | Case 2 | Case 1 |
| Multiplication | 4 | 0 | 0 | 0 |
| Division | 2 | 0 | 0 | 0 |
| TOTALS | 40 | 0 | 0 | 0 |

While the invention has been described in terms of specific embodiments, it is evident in view of the foregoing description that numerous alternatives, modifications and variations will be apparent to those skilled in the art. Thus, the invention is intended to encompass all such alternatives, modifications and variations which fall within the scope and spirit of the invention and the appended claims.

We claim:

1. A method of picking an image on a display screen, comprising the steps of:

(a) displaying a pick marker on said display screen;

(b) directing said pick marker at an image on said display screen for picking said image, said image comprising at least one line primitive, said at least one line primitive having end-point coordinates $x_1, y_1$ and $x_2, y_2$ on an x-y coordinate system, said pick marker having a diamond shaped pick window corresponding thereto, and said diamond shaped pick window having a first diagonal with a length of $2h$ and a second diagonal with a length of $2w$;

(c) subjecting said at least one line primitive to a trivial test, said trivial test comprising enclosing said diamond shaped pick window in a least enclosing rectangle, wherein said diamond shaped pick window and said rectangle have a common center point, and rejecting said at least one line primitive if said at least one line primitive has both of its end-points outside of the same extended edge of said rectangle;

(d) if said at least one line primitive cannot be trivially tested in step (c), subjecting said at least one line primitive to a non-trivial test which does not require performing floating point operations, and accepting or rejecting said at least one line primitive in accordance with the results of said non-trivial test;

(e) considering accepted line primitives as being selected; and, (f) selecting said image on said display corresponding to said selected line primitives for further processing.

2. A method according to claim 1, wherein said trivial test of step (c) further comprises accepting said at least one line primitive if said at least one line primitive has its end-points in opposite outer, non-extended edge regions relative to said rectangle.

3. A method according to claim 2, wherein said trivial test of step (c) comprises an enhanced version of the Cohen-Sutherland test.

4. A method according to claim 1, wherein said non-trivial test of step (d) comprises determining if one or both end-points of said at least one line primitive is within said rectangle, and accepting said at least one line primitive if one or both end-points of said at least one line primitive is within said diamond shaped pick window, and if neither end-point is within said diamond-shaped pick window, determining if said at least one line primitive crosses either diagonal of said diamond shaped pick window, and rejecting said at least one line primitive if it is determined that said at least one line primitive does not cross either diagonal of said diamond shaped pick window, and accepting said at least one line primitive if it is determined that said at least one line primitive crosses either diagonal of said diamond shaped pick window.

5. A method according to claim 4, wherein said trivial test of step (c) comprises the Cohen-Sutherland test, and wherein determining if one or both end-points of said at least one line primitive is within said rectangle, in said non-trivial test of step (d), is accomplished by subjecting said at least one line primitive to the Cohen-Sutherland test.

6. A method according to claim 4, wherein determining if said at least one line primitive crosses either diagonal of said diamond shaped pick window is accomplished according to the steps of, transforming said rectangle and said diamond shaped pick window such that the common center point is located at origin coordinates 0,0, and such that said first diagonal of said diamond shaped pick window is along the y axis and said second diagonal of said diamond shaped pick window is along the x axis, and transforming the end-point coordinates of said at least one line primitive in accordance with and relative to the transformation of the coordinates of the center of said rectangle and said diamond shaped pick window, and determining if said at least one line primitive satisfies a first condition wherein $|h*dx|>=|T|$, or a second condition wherein $|w,dy|>=|T|$, where the end-points of the line primitive are located at coordinates $x_1, y_1$ and $x_2, y_2$; $dx=x_1-x_2$; $dy=y_1-y_2$; and $T=x_1*y_2 - y_1*x_2=y_1*dx-x_1*dy$, and accepting said at least one line primitive if either said first condition or said second condition is satisfied, and rejecting said at least one line primitive if neither said first condition nor said second condition is satisfied.

7. A method according to claim 4, wherein said trivial test of step (c) further comprises accepting said at least one line primitive if said at least one line primitive has its end-points in opposite outer, non-extended edge regions relative to said rectangle.

8. A method according to claim 7, wherein said trivial test of step (c) comprises an enhanced version of the Cohen-Sutherland test.

9. A method according to claim 1, wherein said non-trivial test of step (d) comprises determining if one or both end-points of said at least one line primitive is within said rectangle, and if one or both end-points of said at least one line primitive is determined to be within said rectangle, transforming said rectangle and said diamond shaped pick window such that the common center point is located at origin coordinates 0,0, and such that said first diagonal of said diamond shaped pick window is along the y axis and said second diagonal of said diamond shaped pick window is along the x axis, and transforming the end-point coordinates of said at least one line primitive in accordance with and relative to the transformation of the coordinates of the center of said rectangle and said diamond shaped pick window, determining if said at least one line primitive crosses either the x axis or the y axis, and if said at least one line primitive crosses either the x axis or the y axis, determining if said at least one line primitive crosses either said first diagonal or said second diagonal, and accepting said at least one line primitive if it is determined that said at least one line primitive crosses either said first diagonal or said second diagonal, and if it is determined that said at least one line primitive does not cross either said first diagonal or said second diagonal, determining if the end-point(s), determined to be within said rectangle, is within said diamond shaped pick window, and accepting said at least one line primitive if the end-point(s) determined to be within said rectangle is within said diamond shaped pick window, and rejecting said at least one line primitive if the end-point(s) determined to be within said rectangle is not within said diamond shaped pick window, and if neither end-point is determined to be within said rectangle, determining if said at least one line primitive crosses either diagonal of said diamond shaped pick window, and rejecting said at least one line primitive if it is determined that said at least one line primitive does not cross either diagonal of said diamond shaped pick window, and accepting said at least one line primitive if it is determined that said at least one line primitive crosses either diagonal of said diamond shaped pick window.

10. A method according to claim 9, wherein said trivial test of step (c) comprises the Cohen-Sutherland test, and wherein determining if one or both end-points of said at least one line primitive is within said rectangle, in said non-trivial test of step (d), is accomplished by subjecting said at least one line primitive to the Cohen-Sutherland test.

11. A method according to claim 9, wherein determining if said at least one line primitive crosses either diagonal of said diamond shaped pick window is accomplished according to the steps of, transforming said rectangle and said diamond shaped pick window such that the common center point is located at origin coordinates 0,0, and such that said first diagonal of said diamond shaped pick window is along the y axis and said second diagonal of said diamond shaped pick window is along the x axis, and transforming the end-point coordinates of said at least one line primitive in accordance with and relative to the transformation of the coordinates of the center of said rectangle and said diamond shaped pick window, and determining if said at least one line primitive satisfies a first condition wherein $|h*dx| >= |T|$, or a second condition wherein $|w*dy| >= |T|$, where the end-points of the line primitive are located at coordinates $x_1$, $y_1$ and $x_2$, $y_2$; $dx=x_1-x_2$; $dy=y_1-y_2$; and $T=x_1*y_2 - y_1*x_2 = y_1*dx - x_1*dy$, and accepting said at least one line primitive if either said first condition or said second condition is satisfied, and rejecting said at least one line primitive if neither said first condition nor said second condition is satisfied.

12. A method according to claim 9, wherein determining if said at least one line primitive crosses said first diagonal is accomplished by determining if said at least one line primitive satisfies the condition that $|h*dx| >= |T|$ and determining if said at least one line primitive crosses the y axis, and determining if said at least one line primitive crosses said second diagonal is accomplished by determining if said at least one line primitive satisfies the condition that $|w*dy| >= |T|$ and determining if said at least one line primitive crosses the x axis, where the end-points of the line primitive are located at coordinates $x_1$, $y_1$ and $x_2$, $y_2$; $dx=x_1-x_2$; $dy=y_1-y_2$; and $T=x_1*y_2-y_1*x_2=y_1*dx-x_1*dy$.

13. A method according to claim 9, wherein determining if the end-point(s), determined to be within said rectangle, is within said diamond shaped pick window is accomplished by determining if each said end-point satisfies the condition that $|w*y|+|h*x|<=wh$, where x and y are the coordinates of the end-point.

14. A method according to claim 9, wherein said trivial test of step (c) further comprises accepting said at least one line primitive if said at least one line primitive has its end-points in opposite outer, non-extended edge regions relative to said rectangle.

15. A method according to claim 14, wherein said trivial test of step (c) comprises an enhanced version of the Cohen-Sutherland test.

* * * * *

UNITED STATES PATENT AND TRADEMARK OFFICE
CERTIFICATE OF CORRECTION

PATENT NO. : 5,483,258
DATED : January 9, 1996
INVENTOR(S) : Kevin B. Cornett, Edward F. Mark It is certified that error appears in the above-indentified patent and that said Letters Patent is hereby corrected as shown below:

In column 18, line 2 after "$y_2$; $dx=x_1-x_2$;", please delete $dy^{y_1}$ and insert --$dy=y_1$--.

Signed and Sealed this

Twentieth Day of May, 1997

Attest:

BRUCE LEHMAN

Attesting Officer

Commissioner of Patents and Trademarks